May 23, 1939.  O. C. DURYEA  2,159,138
CAR TRUCK
Filed July 30, 1936  2 Sheets-Sheet 1
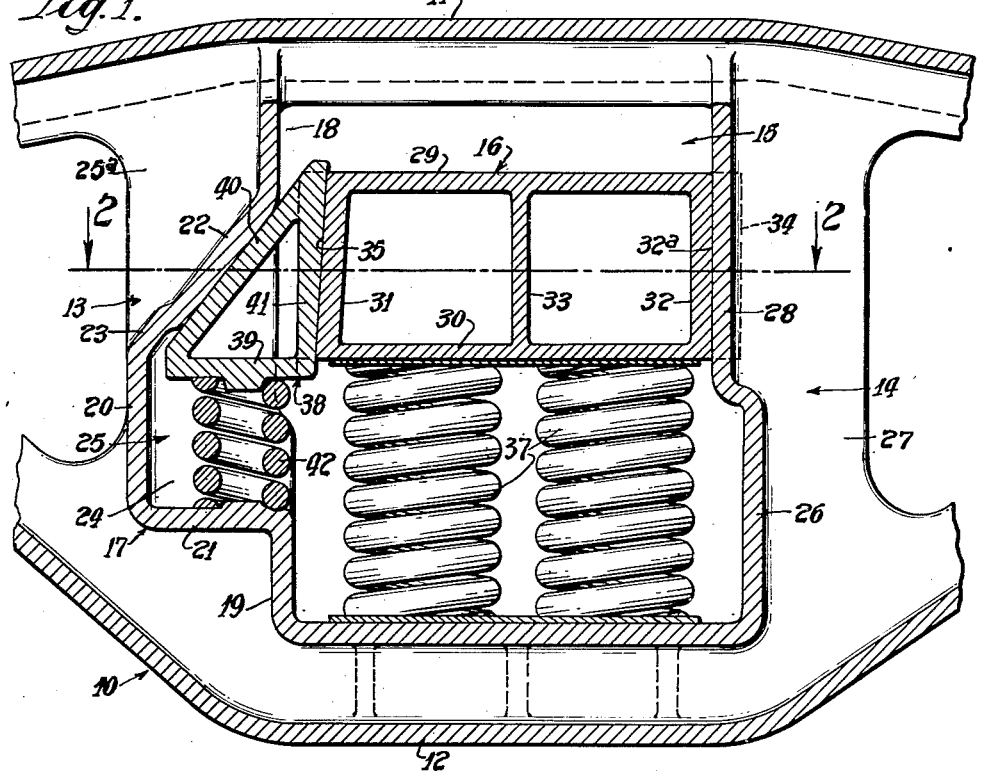
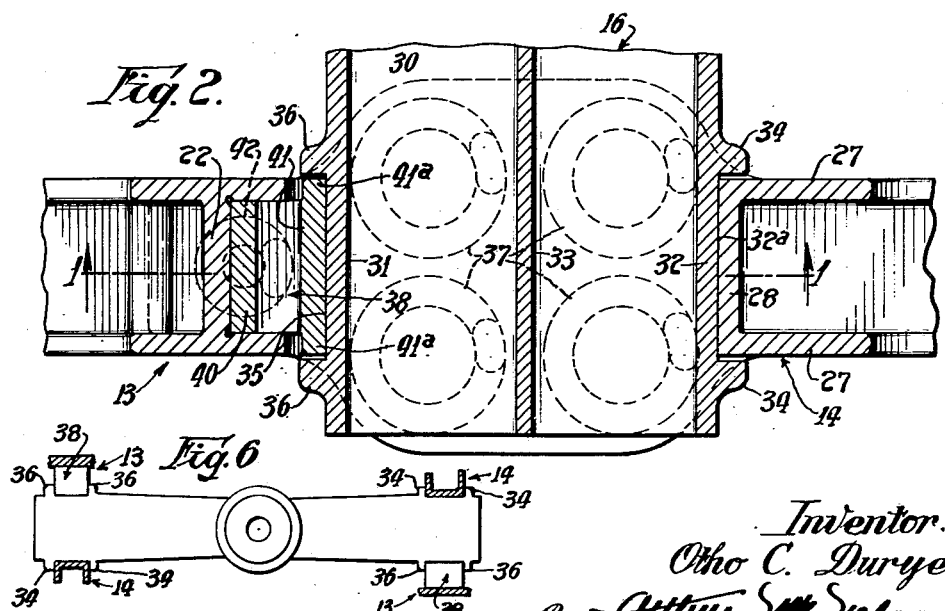
Inventor:
Otho C. Duryea,
Witness:
E. Camporini May 23, 1939.    O. C. DURYEA    2,159,138
CAR TRUCK
Filed July 30, 1936    2 Sheets-Sheet 2
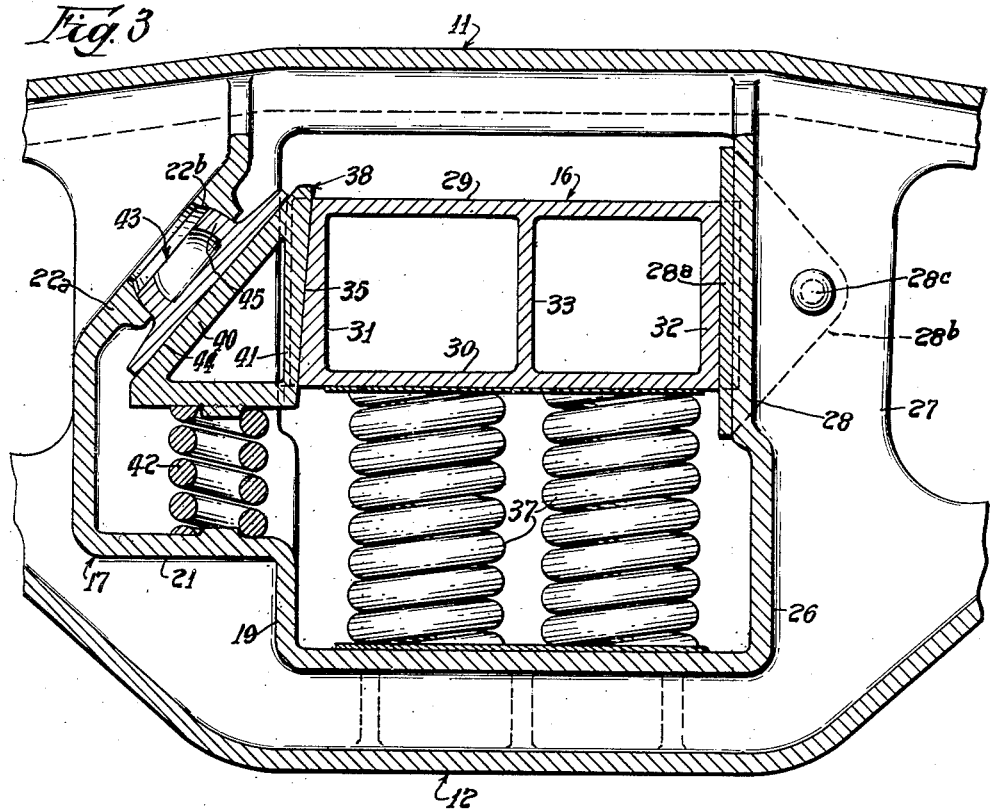
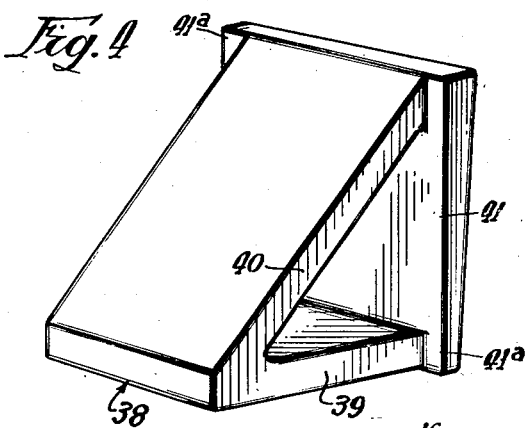
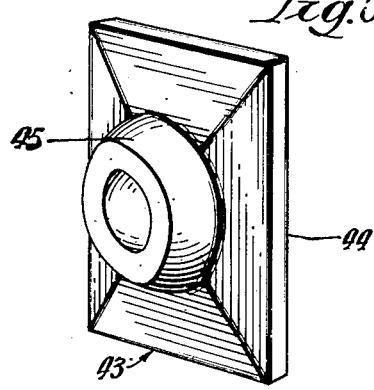
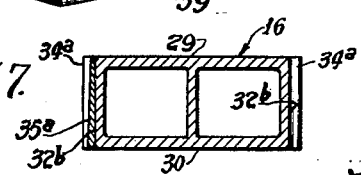
Witness:
E. Campouri
Inventor:
Otho C. Duryea,
By Arthur W. Wilson
Attorney Patented May 23, 1939

2,159,138

UNITED STATES PATENT OFFICE 2,159,138

CAR TRUCK

Otho C. Duryea, Waterbury, Conn.

Application July 30, 1936, Serial No. 93,436

35 Claims. (Cl. 105—193)

This invention relates to improvements in car trucks and it consists of the matters hereinafter described and more particularly pointed out in the appended claims.

One of the objects of the present invention is to provide a car truck operative to permit a relative free downward cushioned movement of the associated bolster end under load but to dampen, snub or restrain the upward rebound movement thereof.

Another object of the invention is to provide a structure in a car truck which effectively controls the harmonic bouncing of the bolster end so destructive to lading, and at the same time eliminate the overload blows on the side frame.

A further object of the invention is to provide a car truck structure including rebound dampening or restraining means which is simple in construction, positive in operation at all times, will automatically adjust itself to compensate for wear and is self-cleaning to rid itself of such matter as tends to produce seizing or adhering of the parts.

The above mentioned objects of the invention, as well as others, together with the several advantages thereof, will more fully appear as I proceed with my specification.

In the drawings:

Fig. 1 is a longitudinal vertical section through the mid portion of a car truck side frame embodying the preferred form of the invention, the plane of the section being indicated by the line 1—1 of Fig. 2;

Fig. 2 is a horizontal sectional view through the truck side frame and associated bolster end as taken on the line 2—2 of Fig. 1;

Fig. 3 is a view similar to Fig. 1 illustrating a modified form of the invention;

Fig. 4 is a perspective view of a certain wedge-like block or shoe forming a part of the improved car truck;

Fig. 5 is a perspective view of a certain wear plate which may be advantageously used in the improved truck structure shown in Fig. 3;

Fig. 6 is a diagrammatic view in plan elevation of the truck bolster and in horizontal section through adjacent truck side frame parts showing the disposition of the dampening means between diagonally opposite corners of the bolster and associated side frame parts, and Fig. 7 is a view in end elevation of the bolster, showing the manner in which the conventional type of bolster end may be converted to adapt the same for use in the improved car truck structure.

Referring now in detail to that embodiment of the invention, illustrated in the accompanying drawings and more particularly to Figs. 1, 2 and 4 thereof, 10 indicates as a whole a truck side frame. As shown herein, said side frame includes a top compression member or arch 11, a bottom tension member 12 and laterally spaced columns or vertical walls 13 and 14. These columns or vertical walls are connected at their ends to the compression and tension members respectively, and coact therewith in defining an opening 15 in the side frame to receive the end of the associated truck bolster 16.

As here shown, the column 13 includes a web 17, the top and bottom ends 18 and 19 of which are disposed in substantially the same perpendicular plane. Between its ends, said web includes a laterally outward, offset part 20 which is connected at its bottom end to the web end 19 by a horizontal ledge 21 forming a spring seat as will later appear. An upwardly and inwardly inclined part 22 connects the web parts 20 and 18 together, said part being arranged at an angle approximating 45° to the plane of the web parts 18, 19 and 20 respectively. The web parts 20 and 22 join by an offset part 23, the purpose of which will later appear.

The web parts 20, 21 and 22 are joined at the front and rear by flange 24 so as to there define a pocket 25 and the web parts 18 and 22 are backed up by flanges 25a which merge into the compression member 11.

As shown herein, the column 14 includes a web 26 and flanges 27, the top end portion of the web being offset inwardly of the bolster opening 15 to form a perpendicular guide rail 28 for one side of the bolster end 16.

The bolster, as shown herein, is a cast metal one of a box-like cross section and includes horizontal top and bottom walls 29 and 30, substantially upright side walls 31—32, and an upright intermediate partition 33. The side wall 32 has a perpendicular outer surface 32a for guided engagement with the rail 28 and on said side wall 32 at the ends of said surface are guide lugs 34 for substantial engagement with the parts of the column 14 associated with the rail 28. The other side wall 31 of the bolster end is formed to provide an outer surface 35 which is inclined upwardly and inwardly of the bolster end toward the top wall 29 so as to extend at a lesser angle of inclination than, but in the general direction of, the part 22 of the column 13. At the ends of said surface are guide lugs 36.

Between the end of the bolster 16 and the tension portion 12 of the side frame is located a cushioning means which, as shown herein, constitutes a spring group 37. Suitable retaining plates may be employed between the ends of the springs in this group and the bolster end 16 and side frame member 12. These springs serve to cushion the downward movement of the bolster end so as to avoid the transmission of overload blows from the bolster to the tension member of the side frame.

To cushion or restrain the rebound of the bolster, the following arrangement is provided. In the upper end portion of pocket 25 in the column 13 of each side frame between the web part 22 of the column and the surface 35 of the bolster, is located a wedge-like block or shoe 38. As shown herein, said block or shoe is made as a hollow casting of a substantially a triangular vertical section and it includes a horizontal bottom wall 39, and upwardly converging side walls 40 and 41 respectively. These walls have inclinations complemental to the inclinations of the web parts 22 and surface 35 respectively, before mentioned, and with which they are adapted to engage constantly. The wall 41 is wider than the walls 39—40 so that the lateral extensions 41a thereof engage between the guide lugs 36 on the bolster end.

It is to be noted that the bottom wall 39 of said block or shoe is disposed above the bottom of the pocket 25 as formed by the ledge 21, and between said pocket bottom and said bottom wall 39 is a relatively heavy helical expansion spring 42. It is apparent that this spring has a normal tendency to lift or thrust the block upwardly and through the web part of the column, the thrust is transposed in a lateral one which holds the bolster end in engagement with the other column 14.

In the downward movement of the bolster, the spring group 37 is compressed and operates to cushion the said downward movement. In this downward movement of the bolster end the block or shoe is moved upwardly and inwardly by reason of the spring 42, in sliding guided engagement with the web 22 and bolster surface 35 before mentioned. In this upward and inward movement of the block or shoe, it acts with a lateral thrust, to oppose any lateral movement of the bolster end away from the other column 14.

In the upward movement of the bolster end, as the spring group 37 expands, due to the difference in angularity between the walls 40—41 of the block or shoe 38, said block or shoe is forced downwardly and slightly outwardly to compress the spring 42, the said walls 40—41 rubbing with a friction engagement against the web part 22 and surface 35. This frictional engagement acts to restrain, dampen or snub, and then check the rebound of the bolster. The checking action, however, does not come into play so suddenly as to produce a shock that strains the associated column, but on the contrary, it is an easy and efficient one.

It is pointed out that both side frames of the truck are of the same pattern or form. Therefore, the positions of the columns of one side frame are reversed with respect to those of the other side frame. As best shown in Fig. 6, the means for restraining the vertical movement of the bolster in one direction, are located at opposite sides of the ends of the bolster. In other words, said restraining means are associated with diagonally opposite end corners of the bolster.

The several advantages thereof will be obvious to those skilled in the art.

As the conventional car truck, which only cushions the downward movement of the bolster end, passes at certain speeds over the joints in the rails, said joints induce a frequency movement that sets up a harmonic bouncing, with results well known. In the structure described, as the rebound movement of the bolster is dampened or restrained, the harmonic bouncing is controlled to such an extent as to be substantially eliminated.

It is pointed out that due to the inclination of the surface 35 and wall 41, no matter how long the associated car may be on a side track with a rusting together of said surfaces, so soon as the bolster moves, this will break the bond between the shoe and bolster, when the spring 42 will cause an upward or inward movement of the block or shoe 38 and break the bond between the wall 40 thereof of the web 22. Also, even though the engaging surfaces wear during their frictional engagement, the shoe or block operates automatically to take up such wear.

By reason of the offset 23 at the junction of the web part 20—22, the corner of the bolck 38 as afforded by the meeting ends of the walls 39 and 40 cannot in the movement thereof bite into any part of the column to start a burr at this point.

It is to be borne in mind that when the side frame is an integral casting, certain inequalities might occur therein and especially in that part of the column 13 as includes the web part 22. To overcome such inequalities, a wear plate may be interposed between said web part and the associated wall part of the block or shoe, with the wear plate having a universal or floating movement with respect to one of said parts whereby the plate may move to compensate for such inequalities.

In Fig. 3 I have shown the web parts 22a as having an opening 22b therethrough, the wall of which forms a part of a sphere. Between this web part and the block 38, I provide a wear plate 43. This plate which may be rectangular in shape has a flat face 44 on one side for engagement with the wall 40 of the block 38 and has a hollow partly spherical projection 45 arranged centrally of the other side and to fit in the opening 22b. With such an arrangement the wear plate may shift in one direction about the axis of its projection so as to accommodate the block or shoe. This wear plate is of a width somewhat less than that of the block or shoe wall 40 and therefore, it may move universally within certain limits to accommodate the movement of the block. It is apparent that in the downward movement of the bolster end, the block 38 moves upwardly and inwardly against the surfaces 44—35 and in the upward movement the block moves downwardly and outwardly in frictional engagement with said surfaces to restrain, dampen or snub the rebound of the bolster end.

Instead of the opposite side of the bolster end having a direct bearing engagement with the web part 28 of the associated bolster column, I may provide a hardened steel wear plate 28a therebetween as best shown at the right hand side of Fig. 3. Under such conditions it is preferable that such wear plate be carried by the column and therefore, the wear plate is provided with end flanges 28b for engagement with the flanges 27 of the column. Rivets 28c are employed to secure each to its associated column flange.

The provision of such a wear plate, of course, removes wear from the column and may be easily replaced when necessary.

It may, in some instance, be desired to adapt the invention to cars already in service without discarding the truck bolster thereof and in Fig. 7 is illustrated one manner in which the bolster end may be changed to make it usable. Such bolster, as shown in said Fig. 7, of course, has the conventional straight parallel sides 32b and side frame column guide lugs 34a thereon. With such a structure, I weld an adapter plate 35a into place between the lugs 34a on one side of the bolster end, the plate being tapered toward the top to give the desired angle of inclination to its face, to cooperate with a block or shoe 38 as before described.

It is apparent from the structure above described, that the block mentioned operates to permit a relatively free downward movement of the bolster end whereby the spring group may gradually cushion the same with an absence of overload blows but dampens or snubs the rebound thereof. It is further apparent, that the block or shoe automatically takes up wear, keeps the structure free from lost motion movements and is self-cleaning. It is further evident that due to the few parts employed, the cost is relatively low. Again, there are no parts that can be readily lost.

While in describing the invention, I have referred in detail to the form, arrangement and construction of the parts thereof, this is to be considered only in the illustrative sense so that I do not wish to be limited thereto except as may be specifically set forth in the appended claims.

I claim as my invention:

1. In a car truck, a side frame including laterally spaced columns defining the sides of a bolster opening, a bolster end arranged in said opening, resilient cushion means between said bolster end and a fixed part of the side frame, means on one of said columns and on a part of said bolster end respectively, formed to provide opposed surfaces both inclined in the same direction to the perpendicular but at different relative angles, a member arranged between and formed with surfaces which are complemental to and engaged with both of said inclined surfaces before mentioned, said member coacting with said surfaces to permit compression of said cushion means in the downward movement of said bolster end but to dampen the upward rebound movement of the bolster end in the expansion of said cushion means, and means between said member and another fixed part of the side frame to urge said member in a direction tending to hold its inclined surfaces in engagement with said inclined surfaces on said bolster end and on said means on said column respectively.

2. In a car truck, a side frame including laterally spaced columns defining the sides of a bolster opening, a bolster end arranged in said opening, resilient cushion means between said bolster end and a fixed part of the side frame, a member between one side of the bolster end and one of the side frame columns and having lateral surfaces which are angularly arranged with respect to each other and are operatively engaged with associated surfaces on said one of said side frame columns and on the bolster end respectively, resilient means between said member and a part of the side frame so that said member is operative in the downward movement of the bolster end during compression of the cushioning means to move upwardly and inwardly toward the plane of the bolster, said member in the upward rebound of said bolster end, moving downwardly and outwardly with a friction engagement on both the column and the bolster end to dampen said rebound of the bolster end.

3. In a car truck, a side frame including laterally spaced columns defining the sides of a bolster opening, a bolster end arranged in said opening, a resilient cushion device between said bolster end and a fixed part of the side frame, a member between one side of the bolster end and one of the side frame columns and having lateral surfaces which are angularly arranged with respect to each other and are operatively engaged with associated surfaces on said one of said side frame columns and on the bolster end respectively, resilient means between said member and a part of the side frame so that said member is operative in the downward movement of the bolster end during compression of the cushion device to move upwardly and inwardly toward the plane of the bolster, said member in the upward rebound of said bolster end, moving downwardly and outwardly with a friction engagement on both the column and the bolster end to dampen said rebound of the bolster end, and coacting means on said first mentioned member and on said side of the bolster end and said column respectively, providing a guided path of movement for said first mentioned member.

4. In a car truck, a side frame including laterally spaced columns defining the sides of a bolster opening, a bolster end arranged in said opening, a resilient cushion device between said bolster end and a fixed part of the side frame, means between one end of the bolster and one of the side frame columns and having inclined surfaces frictionally engaged with coacting surfaces on said end of the bolster and on said one of the side frame columns, said means being operative in the downward movement of the bolster end during compression of the cushion device to move upwardly and inwardly toward the plane of the bolster, said means in the upward rebound of said bolster end, moving downwardly and outwardly with a friction engagement on both the column and the bolster end to dampen said rebound of the bolster end, and resilient means between said first mentioned means and a fixed part of the side frame for urging said first mentioned means upwardly and inwardly toward said plane.

5. In a car truck, a side frame including laterally spaced columns defining the sides of a bolster opening, a bolster end arranged in said opening, resilient cushion means between said bolster end and a fixed part of the side frame, means between one side of the bolster end and one of the side frame columns and having inclined surfaces frictionally engaged with coacting surfaces on said end of the bolster and on said one of the side frame columns, said means being operative in the downward movement of the bolster end during compression of the cushion means to move in one direction in a diagonal plane with respect to both said column and said bolster end, and resilient means adapted to cooperate with said means in the rebound of the bolster end to move said means in the other direction in said plane with a friction engagement against said column and said bolster end to dampen the rebound of said bolster end, said resilient means being engaged at one end upon a part of the side frame.

6. In a car truck, a side frame including laterally spaced columns defining the sides of a bolster opening, a bolster end arranged in said opening, a resilient cushion means between the bolster end and a fixed part of the side frame, means on said bolster end providing a surface inclined to the perpendicular at a predetermined angle, a member having a universal bearing engagement with one of said columns and having a surface inclined to the perpendicular at another predetermined angle, a member positioned between said surfaces and having surfaces complemental to the first mentioned ones for a sliding engagement therewith and means between said member and another fixed part of said side frame for urging said member in a direction holding its inclined surfaces against said first mentioned ones.

7. In a car truck, a side frame including laterally spaced columns defining the sides of a bolster opening, a bolster end arranged in said opening, a resilient cushion means between the bolster end and a fixed part of the side frame, means on said bolster end providing a surface inclined to the perpendicular at a predetermined angle, a member associated with one of said columns and formed with a surface inclined to the perpendicular at another predetermined angle, coacting means on said column and on said member providing a ball and socket connection whereby said member may move universally with respect to said column, a wedge-like element between and having surfaces complemental to and engaged with said surfaces on said bolster end and on said member respectively and means between said wedge element and a fixed part of the side frame for holding said element in operative position.

8. In a car truck, the combination of spaced side frames having aligned bolster openings therein, a bolster transversely arranged with its ends positioned in said openings for substantially vertical movement, cushioning means for supporting the bolster, means for restraining the movement of said bolster in an upward direction, said means comprising devices located between one of the side frames and one side of the bolster at one end thereof and between the other of said side frames and the other side of the bolster at the other end thereof, and stationary means on the side frames and engageable by parts of the bolster at the opposite sides of each end thereof providing a vertical guided movement therefor.

9. In a car truck, the combination of spaced side frames having aligned bolster openings therein, a bolster transversely arranged with its ends positioned in said openings for substantially vertical movement, cushioning means for supporting the bolster, means for restraining the movement of said bolster in an upward direction, said means comprising devices located between one set of diagonally opposite corners of the bolster and associated parts of both side frames, and stationary means on both side frames and engageable by the other set of diagonally opposite corners of the bolster providing a vertical guided movement therefor.

10. In a car truck, the combination of a truck side frame having a bolster opening, a bolster end arranged in said opening for a vertical movement in both directions, cushioning means for supporting the bolster end from the side frame, a wedge-like member between adjacent parts of the side frame and bolster end respectively, said wedge member and said parts of the side frame and bolster end having complementally inclined surfaces and means operative to urge the wedge-like member upwardly when the bolster end moves downwardly, and to permit the wedge-like member to move downwardly when the bolster end moves upwardly.

11. In a car truck, the combination of a truck side frame having a bolster opening, a bolster end arranged in said opening for a vertical movement in both directions, cushioning means for supporting the bolster end from the side frame, a wedge-like member between adjacent parts of the side frame and bolster end respectively, and means operative to urge the wedge-like member upwardly when the bolster end moves downwardly, said side frame and bolster end and wedge-like member having surfaces coacting to force the wedge-like member downwardly as the bolster end moves upwardly.

12. In a car truck, a side frame column member defining one side of a bolster opening, a bolster member having a part disposed in said opening, means providing a surface on one of said members, inclined to the perpendicular in one direction at one angle, a third member having a universal bearing engagement with the other of said members and having a surface inclined to the perpendicular in the same direction, but at an angle different from the first mentioned surface, a fourth member arranged between said inclined surfaces and having surfaces for sliding engagement with said first mentioned surfaces and means between said fourth member and a fixed part of the side frames for urging said fourth member in a direction holding its inclined surfaces against the first mentioned ones.

13. In a car truck a side frame column member defining one side of a bolster opening, a bolster member having a part disposed in said opening, means providing a surface on one of said members, inclined to the perpendicular in one direction at one angle, a third member having a surface inclined to the perpendicular in the same direction but at an angle different from the first mentioned surface, means providing a ball and socket engagement between said third member and one of said first mentioned members, a fourth member arranged between and having surfaces for sliding engagement with said first mentioned surfaces, and means between said fourth member and a fixed part of the side frame for urging said fourth member in a direction holding its inclined surfaces against the first mentioned ones.

14. In a car truck, a side frame including spaced columns defining a bolster opening, means providing perpendicular, frictionally engaged surfaces on one side of the bolster and on one of the columns respectively, means providing opposed surfaces on the other side of the bolster and on the other column respectively and which opposed surfaces are inclined in the same direction from the perpendicular but at different angles, a member having surfaces substantially complemental to and frictionally engaged with said opposed surfaces, and means between said member and a fixed part of the side frame for urging said member in a direction increasing the frictional engagement of all of the said engaging surfaces.

15. In a car truck, a side frame including spaced columns defining the sides of a bolster opening, a bolster end in said opening, a resilient cushion means between said bolster end and a fixed part of the side frame, means providing opposed converging surfaces on one of said columns and on the associated side of the bolster and which surfaces are inclined in the same direction from the perpendicular but at different angles, a single wedge shaped member having opposed surfaces complemental to and engaged with said first mentioned surfaces and resilient means between said wedge shaped member and a part of the side frame and normally urging said member in the direction of the convergence of said opposed surfaces.

16. In a car truck, a side frame including spaced columns defining the sides of a bolster opening and one of which columns has a recess that communicates with said opening, a bolster end in said opening, a resilient means between the bolster end and side frame, means providing a surface in said recess which is inclined from the perpendicular, the bolster end having a surface opposed to the first mentioned one and also inclined to the perpendicular in the same direction, but at an angle different from the first mentioned surface whereby said surfaces converge in one direction, a member arranged with at least a portion thereof in said recess and having opposed surfaces complemental to and engaged with said first mentioned surfaces and resilient means between a part of the side frame and one end of said member and operating normally to urge the said member in the direction of the convergence of said first mentioned surfaces.

17. In a car truck, a side frame including spaced columns defining the sides of a bolster opening, a bolster end arranged in said opening, resilient cushion means between said bolster end and a fixed part of the side frame, a wedge member between one side of the bolster end and one of the side frame columns and having lateral friction surfaces inclined in the same direction from the perpendicular, said surfaces being engaged with coacting surfaces on said bolster end and on one of said columns respectively, and resilient means engaged with said member and a part of the side frame respectively so as to permit compression of the cushion means in the downward movement of the bolster end but to dampen the upward rebound movement of the bolster end in the expansion of said cushion means.

18. In a car truck, a side frame including laterally spaced columns defining the sides of a bolster opening, a bolster end arranged in said opening, resilient cushion means between said bolster end and a fixed part of the side frame, one of said columns and a part of said bolster end respectively being formed to provide opposed friction surfaces that are inclined in the same direction from the perpendicular, a member arranged between and formed with surfaces which are complemental to and engaged with both of said opposed friction surfaces before mentioned, said member coacting with said surfaces to permit compression of said cushion means in the downward movement of the bolster end, and resilient means between said member and a part of the side frame and cooperating with said member to engage the said surfaces thereof with said opposed friction surfaces to dampen the upward rebound movement of the bolster end in the expansion of said cushion means.

19. In a car truck, a side frame including laterally spaced column members defining the sides of a bolster opening, an end portion of a bolster member arranged in said opening, a resilient cushion means between said portion of the bolster member and a fixed part of the side frame, one of said members providing a friction surface inclined in one direction to the perpendicular at a predetermined angle, a member having a universal bearing engagement with the other of said members and providing a friction surface also inclined in said one direction to the perpendicular and disposed at an angle to the first mentioned one, a wedge like member having surfaces complemental to the first mentioned ones for a frictional engagement therewith, and means between said wedge like member and a fixed part of the side frame for urging said wedge like member in a direction holding its surfaces against the said first mentioned ones.

20. In a car truck, a side frame including spaced columns defining the sides of a bolster opening, a bolster end arranged in said opening, relatively angular friction surfaces on one side of the bolster end and the associated side frame column that are inclined in the same direction to the perpendicular, a wedge member having surfaces frictionally engaged with said first mentioned friction surfaces, a spring engaged between a part of the side frame and said wedge member for urging the same in a direction tending to hold its surfaces in engagement with said first mentioned surfaces, and perpendicular, frictionally engaged surfaces on the other side of the bolster end and its associated side frame column respectively.

21. In a car truck, a side frame including spaced columns defining the sides of a bolster opening, a bolster end arranged in said opening, a pair of opposed friction surfaces on one side of the bolster end and on the associated side frame column respectively and which surfaces are inclined in the same direction from the perpendicular, a wedge member having surfaces frictionally engaged with said first mentioned friction surfaces, resilient means between a part of said side member and said wedge member for urging the latter in a direction tending to hold its surfaces in engagement with said first mentioned surfaces, and perpendicular, frictionally engaged surfaces on the other side of the bolster end and its associated side frame column.

22. In a car truck, a side frame including laterally spaced columns defining the sides of a bolster opening, a bolster end arranged in said opening, resilient cushion means between said bolster end and a fixed part of the side frame, coacting means between one side of the bolster end and one of said columns providing a vertical guided movement therefor, the other side of said bolster end and the other column of the side frame cooperating in offering opposed surfaces which are relatively inclined to the perpendicular and to each other, a wedge member engaged with said opposed surfaces, and spring means between said wedge member and a fixed part of the side frame, said wedge member operating to permit compression of said resilient cushion means in the downward movement of the bolster end and operating to dampen the upward rebound movement of the bolster end.

23. In a car truck, a side frame including laterally spaced columns defining the sides of a bolster opening, a bolster end arranged in said opening, resilient cushion means between said bolster end and a fixed part of the side frame, coacting means between one side of the bolster end and one of said columns providing a vertical guided movement therefor, the other side of the bolster end and the other column of the side frame cooperating in offering opposed surfaces which are relatively inclined to the perpendicular and to each other, a wedge member engaged with said opposed surfaces, spring means between said wedge member and fixed part of the side frame, said wedge member in the downward movement of the bolster end during compression of the cushioning means moving upwardly and inwardly toward the plane of the bolster end, said member in the upward rebound movement of the bolster end moving downwardly and outwardly with a friction engagement on both of said opposed surfaces to dampen said rebound movement of the bolster end.

24. In a car truck, the combination of spaced side frames having front and rear columns providing aligned bolster openings therein, a bolster transversely arranged with its ends positioned in said openings for substantially vertical movement, cushioning means for supporting said ends of the bolster from said side frames, and friction means for restraining the movement of said bolster ends in one direction, said means comprising devices located only between the front column of one side frame and the associated side of the bolster at one end thereof and between the rear column of the other side frame and the associated side of the bolster at the other end thereof, the rear column of said one of said side frames and the associated side of the first mentioned end of the bolster being frictionally engaged and the front column of said other side frame and the associated side of the second mentioned end of the bolster being frictionally engaged.

25. In a car truck, a side frame including vertical columns or walls defining the sides of a bolster opening, a bolster end arranged in said opening, resilient cushion means carried by the side frame for supporting the bolster end, there being inclined surfaces on one side of the bolster end and on the associated side frame column and which surfaces are disposed at different angles to the perpendicular, a member arranged between and engaged with said surfaces, and resilient means between said member and a part of the side frame, said member being operative to permit compression of the cushion means during downward movement of the bolster end and to restrain the upward rebound movement of the bolster end during the expansion of said cushion means.

26. In a car truck, a side frame including vertical columns or walls defining the sides of a bolster opening, a bolster end arranged in said opening, resilient cushion means carried by the side frame for supporting the bolster end, there being inclined surfaces on one side of the bolster end and on the associated side frame column and which surfaces are disposed at different angles to the perpendicular, a member arranged between and engaged with said surfaces, resilient means between said member and a part of the side frames, said member being operative to permit compression of the cushion means during downward movement of the bolster end and to restrain the upward rebound movement of the bolster end during the expansion of said cushion means, and coacting perpendicular friction surfaces between the other side of the bolster end and the other column of the side frame.

27. In a car truck, the combination of spaced side frames, each having a bolster opening therein, a bolster extending between said side frames and having its ends arranged one in each side frame opening for substantially vertical movement, cushioning means between each side frame and associated bolster end, means including a spring pressed wedge block and associated friction surfaces between each of one pair of diagonally opposite end portions of the bolster and associated parts of the side frames, and means providing coacting friction surfaces between each of the other pair of diagonally opposite end portions of the bolster and associated parts of the side frames for coacting with said last mentioned means in restraining said substantially vertical movement of said bolster ends in said side frame openings.

28. In a car truck, the combination of spaced side frames each having a bolster opening therein defined at the sides by a pair of spaced columns, a bolster extending between said side frames and having its ends arranged one in each side frame opening for substantially vertical movement, cushion means between each side frame and associated bolster end, spring pressed friction dampening means between each of one pair of diagonally opposite end portions of the bolster and associated columns of the side frames, means on the other column of both side frames providing substantially vertically disposed surfaces with which each of the other pair of diagonally opposite end portions of the bolster frictionally engage for coacting with said dampening means in restraining said substantially vertical movement of the bolster ends in said side frame opening.

29. In a car truck, the combination of a pair of spaced side frames each including a pair of spaced apart columns defining the sides of a bolster opening therein, a truck bolster having its ends disposed in operative relation with respect to the openings in both side frames for a vertical movement, cushioning means between each side frame and the associated end of the bolster, means between one pair of diagonally opposite end portions of the bolster and the associated columns of the respective frames for dampening the said vertical movement of the bolster ends in said side frame openings, and means providing frictional engagement between the other diagonally opposite end portions of the bolster and the associated side frame columns.

30. In a car truck, the combination of spaced side frames having aligned bolster openings therein, each bolster opening being defined at the sides by a pair of spaced front and rear columns, a bolster transversely arranged with its ends positioned in said openings for substantially vertical movement, cushioning means for supporting said bolster ends, means for restraining the movement of said bolster ends in one direction vertically, said means comprising friction producing devices located between the front column of one side frame and one side portion of the bolster at one end thereof and between the rear column of the other side frame and the diagonally opposite side portion of the bolster at the other end thereof, and means on the other front and rear columns of both side frames providing substantially vertically disposed surfaces with which the other side portions of the ends of the bolster have a friction engagement for cooperating with said friction producing devices in restraining said substantially vertical movement of the bolster ends in said side frame.

31. In a car truck, a side frame including laterally spaced columns defining the sides of a bolster opening, a bolster end arranged in said opening, coacting means on one side of said bolster end and on one of said columns respectively providing vertically disposed engaging friction surfaces, means providing opposed friction surfaces on the other side of said bolster end and the other of said columns respectively, wedge means engaged with said opposed friction surfaces, and a plurality of springs all engaged at one end upon the side frame, the other end of certain of said springs being engaged with the bolster end and the other end of certain of the other of said springs being engaged with a part of said wedge means engaged with said opposed friction surfaces.

32. In a car truck, a side frame including laterally spaced column members defining the sides of a bolster opening, a bolster member having a portion arranged in said opening for a vertical movement, a resilient cushion means between said portion of said bolster member and a fixed part of the side frame, means providing a relative sliding engagement between one side of the bolster member and one of said column members, a plate like member mounted for universal movement on the other of said column members, the other side of said bolster member and the said plate like member providing opposed friction surfaces which are angularly disposed with respect to each other, but are inclined in the same direction from the perpendicular, a wedge block having friction surfaces complemental to and engaged with said angularly disposed friction surfaces, and means between said wedge block and another part of the side frame for urging the wedge block in a direction holding its friction surfaces in engagement with said friction surfaces as provided by said bolster member and by said plate like member respectively.

33. In a car truck, a side frame including laterally spaced column members defining the sides of a bolster opening, a bolster member having a portion arranged in said opening for a vertical movement, a resilient cushion means between said portion of said bolster member and a fixed part of the side frame, means providing a relative sliding engagement between one side of the bolster member and one of said column members, a plate like member having a ball and socket connection with the other of said column members so as to be capable of a limited relative universal movement, the other side of the bolster member and the said plate like member providing opposed friction surfaces which are angularly disposed with respect to each other but are inclined in the same direction from the perpendicular, a wedge block having friction surfaces complemental to and engaged with said angularly disposed friction surfaces and means between said wedge block and the side frame for urging the wedge block in a direction holding its opposed surfaces in engagement with said friction surfaces as provided by said bolster member and by said plate like member respectively.

34. In a car truck, the combination of spaced side frames each having a bolster opening therein, a bolster transversely arranged with its ends positioned in said openings for substantially vertical movement, cushioning means for supporting said bolster, and coacting means each including a spring pressed wedge block and associated friction surfaces between one pair of diagonally opposite end corners of the bolster and associated parts of the side frames, fixed parts on the other pair of diagonally opposite end corners of the bolster frictionally engaging associated fixed parts of said side frames for cooperating with said coacting means in restraining movement of the bolster ends in one direction vertically in said side frame openings.

35. In a car truck, the combination of spaced side frames, each including a pair of laterally spaced columns defining a bolster opening in the respective side frames, a truck bolster arranged transversely of the side frames and having its ends arranged in said openings in the side frames for a vertical movement, cushioning means between each side frame and the associated end of the bolster, and means including a spring pressed friction mechanism between each one of a pair of diagonally opposite end corners of the bolster and associated side frame columns and coacting with fixed parts on each one of the other pair of diagonally opposite end corners of the bolster that frictionally engage with fixed parts on the associated side frame columns for dampening the vertical movement of the bolster ends in one direction in said side frame openings.

OTHO C. DURYEA.